US012779566B2

(12) United States Patent
Song

(10) Patent No.: US 12,779,566 B2
(45) Date of Patent: Nov. 3, 2026

(54) DRAINING MECHANISM

(71) Applicant: FANUC CORPORATION, Minamitsuru-gun (JP)

(72) Inventor: Shijin Song, Minamitsuru-gun (JP)

(73) Assignee: FANUC CORPORATION, Minamitsuru-gun (JP)

( * ) Notice: Subject to any disclaimer, the term of this patent is extended or adjusted under 35 U.S.C. 154(b) by 631 days.

(21) Appl. No.: 18/277,514

(22) PCT Filed: Feb. 4, 2022

(86) PCT No.: PCT/JP2022/004350
§ 371 (c)(1),
(2) Date: Aug. 16, 2023

(87) PCT Pub. No.: WO2022/176639
PCT Pub. Date: Aug. 25, 2022

(65) Prior Publication Data

US 2024/0123529 A1 Apr. 18, 2024

(30) Foreign Application Priority Data

Feb. 17, 2021 (JP) ................................ 2021-023102

(51) Int. Cl.
*B23H 1/00* (2006.01)
*B23H 7/10* (2006.01)

(52) U.S. Cl.
CPC ............... *B23H 1/00* (2013.01); *B23H 7/101* (2013.01); *B23H 7/105* (2013.01)

(58) Field of Classification Search
CPC .......... B23H 1/00; B23H 7/101; B23H 7/105; B23H 7/108; B23H 1/10; B23H 7/10
See application file for complete search history.

(56) References Cited

U.S. PATENT DOCUMENTS

| | | | | |
|---|---|---|---|---|
| 9,833,852 B2 * | 12/2017 | Yamada | ................. | B23H 7/104 |
| 2015/0231716 A1 * | 8/2015 | Yamazaki | ................ | B23H 7/10 219/69.12 |
| 2019/0201994 A1 * | 7/2019 | Makino | .................. | B23H 7/102 |

FOREIGN PATENT DOCUMENTS

| | | |
|---|---|---|
| CN | 1294539 A | 5/2001 |
| CN | 1374898 A | 10/2002 |
| JP | 63-099132 A | 4/1988 |
| JP | 05-092322 A | 4/1993 |

(Continued)

OTHER PUBLICATIONS

Communication dated Mar. 7, 2025 in Taiwanese Application No. 111105348.

(Continued)

*Primary Examiner* — Tiffany T Tran
(74) *Attorney, Agent, or Firm* — Sughrue Mion, PLLC

(57) ABSTRACT

A draining mechanism according to an embodiment comprises a block in which a through hole is formed therethrough along a direction intersecting the gravity direction. The through hole is provided with a first guide portion and a second guide portion. The block comprises: a gas channel connected to the through hole between the first guide portion and the second guide portion; and a discharge port connected to the through hole between the first guide portion and the second guide portion, extending along the gravity direction, and connected to the outside of the block.

5 Claims, 5 Drawing Sheets

(56) References Cited

FOREIGN PATENT DOCUMENTS

| | | | | | |
|---|---|---|---|---|---|
| JP | 10-180546 | A | | 7/1998 | |
| JP | 2006-224215 | A | | 8/2006 | |
| KR | 10-2011-0024331 | A | | 3/2011 | |
| KR | 20110024331 | A | * | 3/2011 | ............ B23H 7/108 |
| TW | 127980 | B | | 2/1990 | |
| WO | 99/032252 | A1 | | 7/1999 | |
| WO | 2015/125259 | A1 | | 8/2015 | |

OTHER PUBLICATIONS

Extended European Search Report dated Jan. 22, 2025 from the European Patent Office in Application No. 22755960.6.

International Search Report for PCT/JP2022/004350 dated Apr. 26, 2022 [PCT/ISA/210].

* cited by examiner

DRAINING MECHANISM

CROSS REFERENCE TO RELATED APPLICATIONS

This application is a National Stage Entry of International Application No. PCT/JP2022/004350 filed Feb. 4, 2022, claiming priority based on Japanese Patent Application No. 2021-023102 filed Feb. 17, 2021, the disclosures of which are incorporated by reference.

TECHNICAL FIELD

The present invention relates to a draining mechanism for removing, from a wire electrode, liquid flowing in a tube through which the wire electrode is inserted.

BACKGROUND ART

JP H05-092322 A discloses a wire electric discharge machine provided with a guide pipe and a draining section. The guide pipe is a pipe for guiding water and a wire electrode. The draining section is provided at the discharge-side end of the guide pipe. The draining section is provided with a water suction section connected to an external suction device. The running water flowing through the guide pipe is sucked by the suction device from the water suction section of the draining section.

SUMMARY OF THE INVENTION

However, there is a need for a draining mechanism for removing liquid flowing inside the tube from the wire electrode without using a suction device.

Accordingly, it is an object of the present invention to solve the above-described problems.

According to an aspect of the present invention, a draining mechanism for removing liquid from a wire electrode, the liquid flowing in a tube through which a wire electrode is inserted and that guides feeding of the wire electrode, the draining mechanism includes:

a block that is formed with a through hole penetrating in a direction intersecting a gravity direction, wherein a discharge-side end portion of the tube is disposed at one end portion of the through hole;

a first guide portion that is provided between the discharge-side end portion of the tube and another end portion of the through hole and is formed with a guide hole guiding the wire electrode from one end portion side of the through hole to another end portion side of the through hole;

a second guide portion that is provided at another end portion of the through hole so as to be apart from the first guide portion and is formed with the guide hole; and wherein the block includes:

a gas channel that is connected to the through hole between the first guide portion and the second guide portion and guides to the through hole compressed gas supplied from the outside; and a discharge hole that is connected to the through hole at a position between the first guide portion and the second guide portion, and extends in the gravity direction and is connected to the outside of the block.

According to the aspect of the present invention, the dielectric working fluid can be removed from the wire electrode without a suction device. That is, in the embodiment of the present invention, the dielectric working fluid flowing out of the first guide portion is discharged under its own weight through the discharge hole. Further, the dielectric working fluid sticking to the wire electrode is blown off by the compressed gas introduced into the through hole between the first guide portion and the second guide portion. Thus, the dielectric working fluid can be removed from the wire electrode without a suction device.

DETAILED DESCRIPTION OF THE INVENTION

Embodiment

Figure 1:
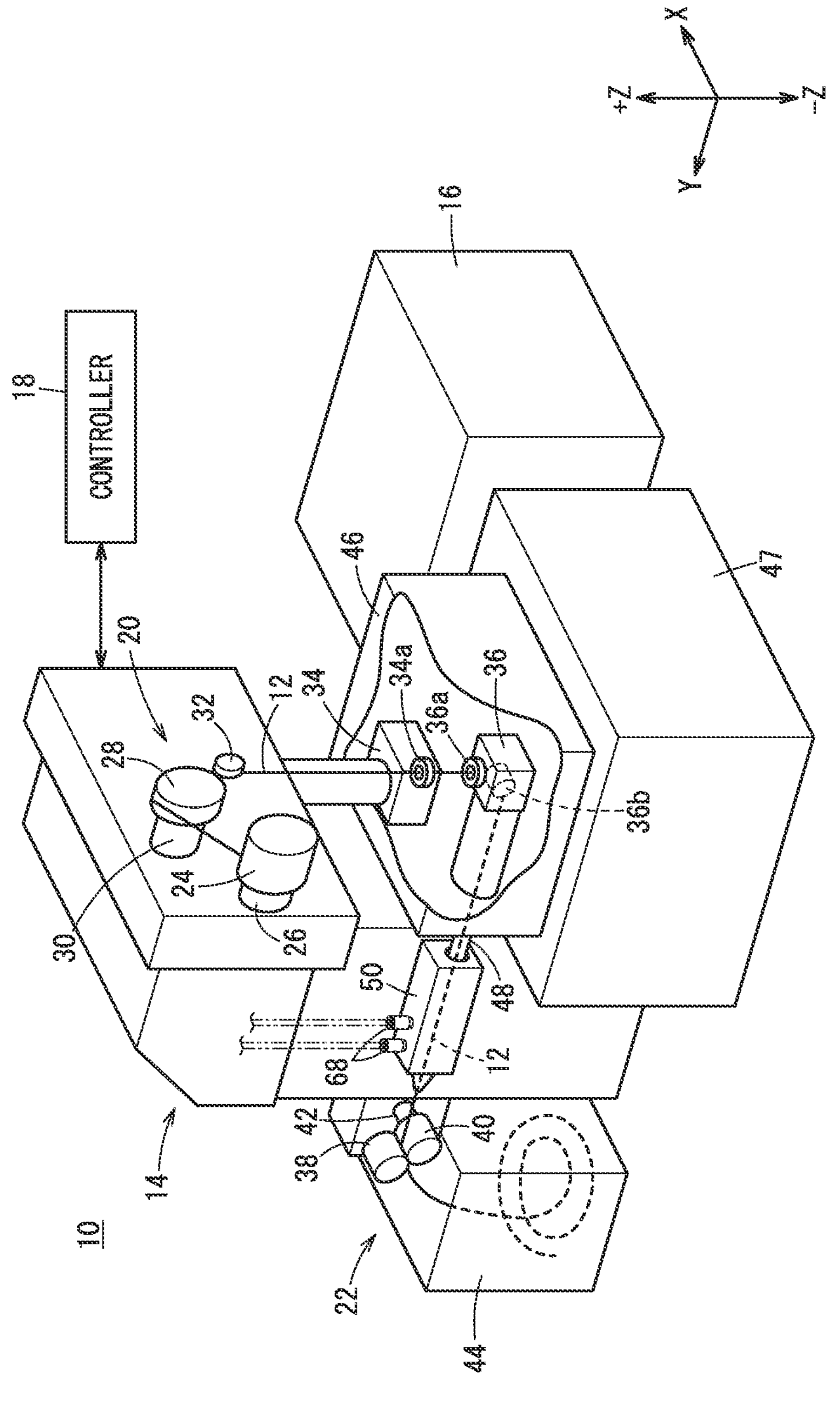
FIG. 1 is a schematic diagram showing a configuration of a wire electric discharge machine according to an embodiment.

FIG. 1 is a schematic diagram showing the configuration of a wire electric discharge machine 10 according to an embodiment. FIG. 1 shows an X direction, a Y direction, and a Z direction in which axes of the wire electric discharge machine 10 extends. The X direction and the Y direction are orthogonal to each other in a plane, and the Z direction is orthogonal to each of the X direction and the Y direction. Note that the −Z direction is a direction in which gravity acts (gravity direction).

The wire electric discharge machine 10 applies voltage between a to-be-processed object immersed in liquid and a wire electrode 12 (to a gap), thereby processing the object by electric discharge generated at the gap. The wire electric discharge machine 10 is provided with a machine main body 14, a dielectric fluid unit 16, and a controller 18 for controlling the machine main body 14 and the dielectric fluid unit 16.

The wire electrode 12 is made of, for example, metal material such as tungsten-based, copper-alloy-based, or brass-based metal material. On the other hand, the object is made of, for example, metal material such as iron-based material or cemented carbide material.

The machine main body 14 is provided with a supply system 20 for supplying a wire electrode 12 toward the object (workpiece), and a collection system 22 for collecting the wire electrode 12 that has passed through the object.

The supply system 20 is provided with a wire bobbin 24, a torque motor 26, a brake shoe 28, a brake motor 30, a tension detection unit 32, and an upper die guide 34. An unused wire electrode 12 is wound around the wire bobbin 24. The torque motor 26 applies torque to the wire bobbin 24. The brake shoe 28 applies braking force of friction to the wire electrode 12. The brake motor 30 applies brake torque to the brake shoe 28. The tension detection unit 32 detects the magnitude of the tension on the wire electrode 12. The upper die guide 34 is a member for guiding the wire electrode 12 and is disposed above the object.

The collection system 22 includes a lower die guide 36, a pinch roller 38 and a feed roller 40, a torque motor 42, and a collection box 44. The lower die guide 36 is a member for guiding the wire electrode 12 and is disposed below the object. The pinch roller 38 and the feed roller 40 sandwich and hold the wire electrode 12. The torque motor 42 applies torque to the feed roller 40. The collection box 44 collects the wire electrode 12 conveyed by the pinch roller 38 and the feed roller 40.

The upper die guide 34 has a support portion 34*a* for supporting the wire electrode 12, and the lower die guide 36 has a support portion 36*a* for supporting the wire electrode 12. The lower die guide 36 includes a guide roller 36*b* for changing the direction of the wire electrode 12 and guiding the wire electrode 12 to the pinch roller 38 and the feed roller 40.

The upper die guide 34 jets clean dielectric working fluid free from sludge (machining chips) toward the gap between the wire electrode 12 and the object. As a result, the gap can be filled with a clean liquid suitable for processing, and it can be prevented that sludge created in accordance with the processing lowers the processing accuracy. As the upper die guide 34, the lower die guide 36 may jet clean dielectric working fluid free from sludge (machining chips) toward the gap between the wire electrode 12 and the object.

The machine main body 14 is provided with a work-pan 46 capable of storing dielectric working fluid. The dielectric working fluid is liquid used at the time of machining. As examples of the dielectric working fluid, deionized water and suchlike can be raised. The work-pan 46 is mounted on the base 47.

The upper die guide 34 and a lower die guide 36 are arranged in a work-pan 46, and an object is provided between the upper die guide 34 and the lower die guide 36. The upper die guide 34, the lower die guide 36, and the object are immersed in the dielectric working fluid stored in the work-pan 46.

A tube 48 for guiding the delivery of the wire electrode 12 is attached to a side wall of the work-pan 46. The tube 48 communicates with the work-pan 46. The wire electrode 12 fed through the guide roller 36*b* is inserted into the tube 48, and the dielectric working fluid in the work-pan 46 flows into the tube 48. The wire electrode 12 inserted into the tube 48 is fed toward a discharge-side end portion of the tube 48. The dielectric working fluid flowing into the tube 48 flows toward the discharge-side end portion of the tube 48. A draining mechanism 50 is provided at the discharge-side end portion of the tube 48. The draining mechanism 50 removes, from the wire electrode 12, the dielectric working fluid flowing through the tube 48. The wire electrode 12 fed from the draining mechanism 50 is collected into the collection box 44 via the pinch roller 38 and the feed roller 40.

The dielectric fluid unit 16 removes sludge generated in the work-pan 46. Further, the dielectric fluid unit 16 controls the liquid quality of the dielectric working fluid by adjusting the electrical resistivity, the temperature, and suchlike. The dielectric working fluid whose liquid quality has been controlled by the dielectric fluid unit 16 is returned to the work-pan 46 and ejected from at least the upper die guide 34.

Figure 2:
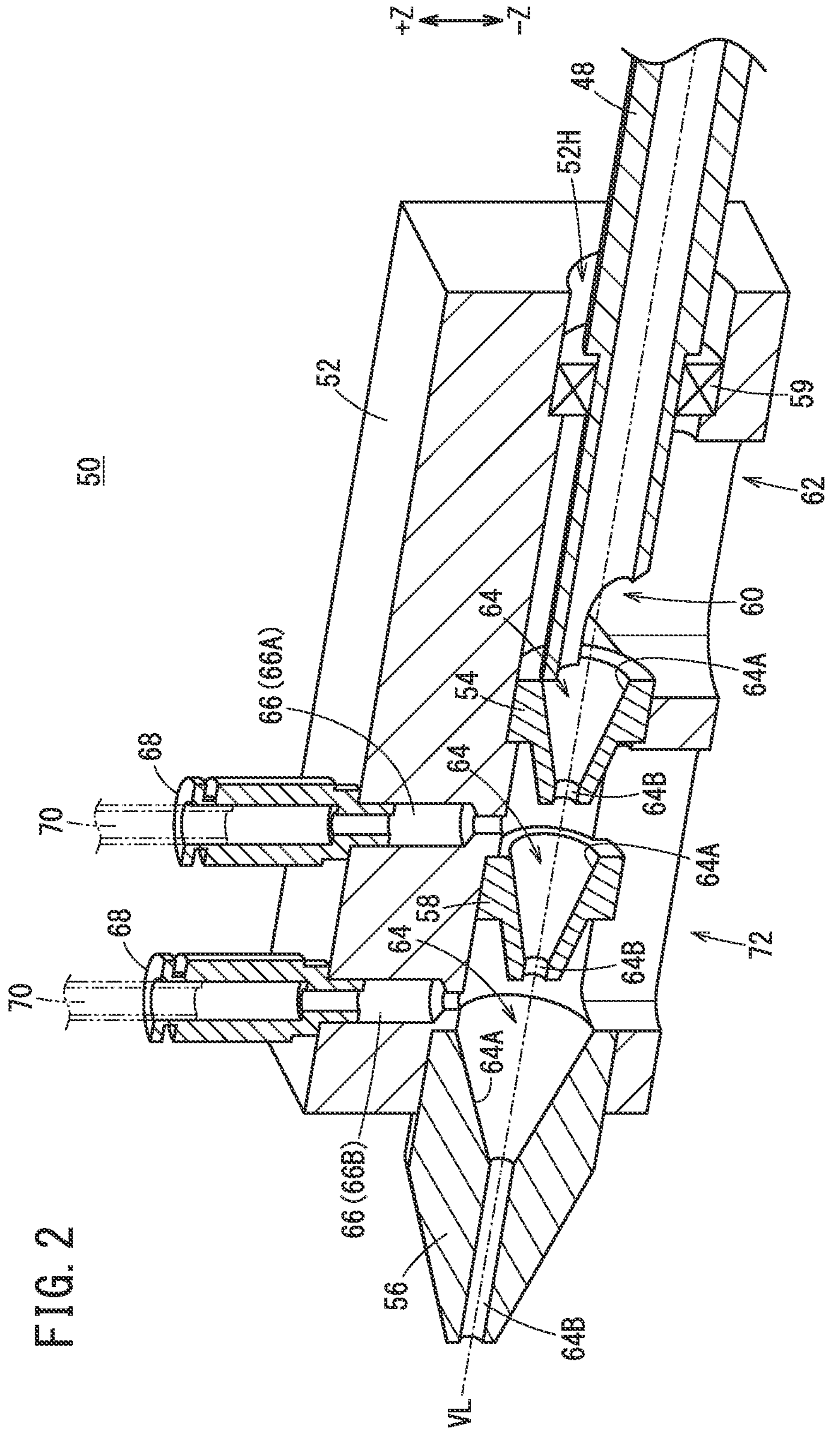
FIG. 2 is a cross-sectional view showing a configuration of a draining mechanism according to an embodiment.
Figure 3:
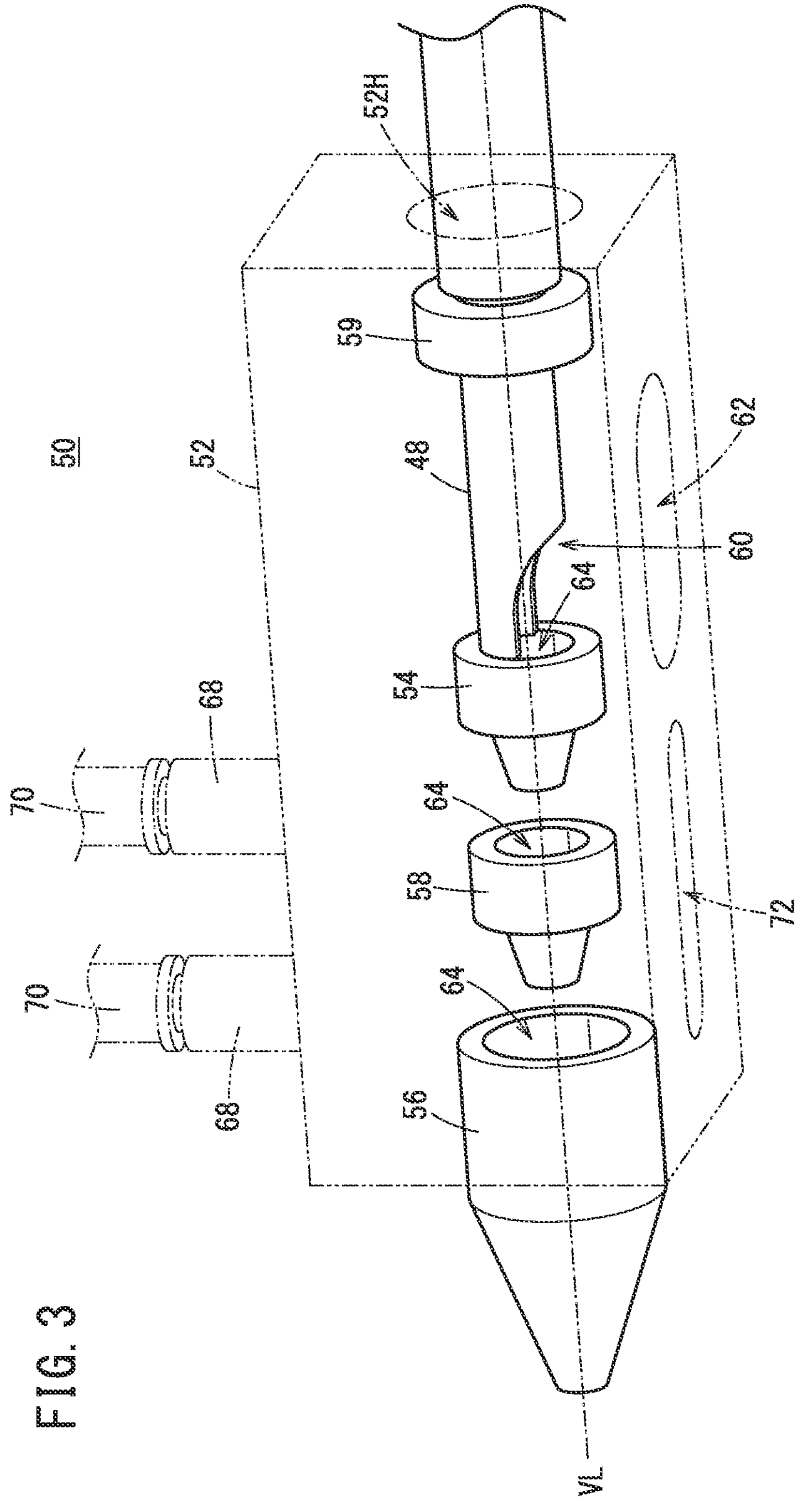
FIG. 3 is a diagram showing the draining mechanism according to the embodiment focusing on the inside of the draining mechanism.

FIG. 2 is a cross-sectional view showing the configuration of the draining mechanism 50 according to the embodiment. FIG. 3 is a view showing a draining mechanism 50 according to the embodiment focusing on the inside of the draining mechanism 50. The draining mechanism 50 includes a block 52, a first guide portion 54, a second guide portion 56, and a third guide portion 58.

The block 52 is a base member of the water draining mechanism 50. The block 52 is fixed, for example, to a housing wall of the machine main body 14 (see FIG. 1). The block 52 is formed with a through hole 52H penetrating therethrough along a direction intersecting the gravity direction. In the case of the present embodiment, the through hole 52H penetrates in a direction orthogonal to the gravity direction (−Z direction).

One end portion of the through hole 52H is an end portion on the side where the wire electrode 12 is inserted, and the other end portion of the through hole 52H is an end portion on the side where the wire electrode 12 is drawn out. Hereinafter, one end of the through hole 52H is referred to as an input end portion, and the other end of the through hole 52H is referred to as an output end portion.

A discharge side end portion of the tube 48 is disposed at the input end portion of the through hole 52H. The discharge-side end portion of the tube 48 is fixed to the block 52 with a fixing member 59. A virtual center line of the discharge side end portion of the tube 48 fixed to the block 52 substantially coincides with a virtual center line VL of the through hole 52H. The virtual center line VL is an imaginary line passing through the center of the cross section of the through hole 52H. The imaginary center line of the tube 48 is an imaginary line passing through the center of the cross section of the tube 48.

The discharge-side end portion of the tube 48 is provided with a cut 60 for removing the dielectric working fluid that flows out of the discharge-side end portion of the tube 48. The cut 60 is provided in the gravity direction (−Z direction). By providing the cut 60, the inside of the discharge side end portion of the tube 48 is exposed to the through hole 52H of the block 52.

The block 52 is provided with a drain channel 62 for guiding the dielectric working fluid that flows out of the cut 60 to the outside of the block 52 in the gravity direction (−Z direction). The drain channel 62 extends in the gravity direction and passes through the cut 60 and the outside of the block 52.

The first guide portion 54 is provided between the discharge side end portion of the tube 48 and the output end portion side of the through hole 52H. The first guide portion 54 is formed with a guide hole 64 for guiding the wire electrode 12 from the input end portion side to the output end portion side of the through hole 52H. The guide hole 64 has a tapered portion 64A and an extended portion 64B. An imaginary center line passing through the center of the cross section of the guide hole 64 substantially coincides with the imaginary center line VL of the through hole 52H.

The tapered portion 64A is formed in such a way that the hole becomes smaller from the input end portion side to the output end portion side of the through hole 52H. The tapered portion 64A guides the tip of the wire electrode 12 to the extended portion 64B. The extended portion 64B extends to the output end portion side of the through hole 52H with the size of the extended portion 64B being approximately the same as the size of the hole at the tip of the tapered portion 64A. The extended portion 64B is formed in the direction in which the through hole 52H penetrates. The extended portion 64B guides the feeding of the wire electrode 12 while maintaining the position of the wire electrode 12 substantially unchanged.

The second guide portion 56 is provided at an output end portion of the through hole 52H. The second guide portion 56 is separated from the first guide portion 54. Part of the second guide portion 56 may extend from the output end portion of the through hole 52H to the outside of the block 52. The second guide portion 56 is formed with a guide hole 64.

The extended portion 64B of the guide hole 64 in the second guide portion 56 may be longer than the extended portion 64B of the guide hole 64 in the first guide portion 54. When the extended portion 64B of the second guide portion 56 is longer than the extended portion 64B of the first guide portion 54, the second guide portion 56 can stably guide the feeding of the wire electrode 12 in comparison with when the extended portion 64B of the second guide portion 56 is the same as the extended portion 64B of the first guide portion 54.

The third guide portion 58 is provided in the through hole 52H between the first guide portion 54 and the second guide portion 56. The third guide portion 58 is separated from the first guide portion 54 and the second guide portion 56. The third guide portion 58 is formed with a guide hole 64.

An outlet of a gas channel 66 of the block 52 opens on the through hole 52H between the third guide portion 58 and the first guide portion 54. In addition, an outlet of a gas channel 66 of the block 52 opens on the through hole 52H between the third guide portion 58 and the second guide portion 56. The gas channel 66 may be constituted by two channels having independent inlets for each of the two outlets or may be constituted by one channel having a common inlet for the two outlets. In the present embodiment, the gas channel 66 is constituted by two channels. One of the two channels constituting the gas channel 66 is referred to as a first gas channel 66A, and the other of the two channels constituting the gas channel 66 is referred to as a second gas channel 66B.

The first gas channel 66A has the outlet connected to the through hole 52H between the third guide portion 58 and the first guide portion 54, and the inlet connected to the outside of the block 52. The second gas channel 66B has the outlet connected to the through hole 52H at a position between the third guide portion 58 and the second guide portion 56, and the inlet connected to the outside of the block 52.

A joint member 68 is provided at each inlet of the first gas channel 66A and the second gas channel 66B. The joint member 68 connects the gas channel 66 (the first gas channel 66A or the second gas channel 66B) and a gas tube 70. One end of the gas tube 70 is attached to the joint member 68, and the other end of the gas tube 70 is attached to a compressor. The compressor may be one dedicated to the draining mechanism 50 or may be one not dedicated to the water draining mechanism 50. As an example of the compressor not dedicated to the draining mechanism 50, can be raised a compressor that supplies compressed gas for cooling the wire electrode 12 when the wire electrode 12 is cut. Further, for example, a compressor may be used that supplies a compressed gas for driving a cylinder valve that controls the flow of dielectric working fluid for feeding the wire electrode 12.

The outlets of the first gas channel 66A and the second gas channel 66B are arranged, in the direction (+Z direction) opposite to the gravity direction (−Z direction), from the path of the wire electrode 12 guided from the input end portion side to the output end portion side of the through hole 52H. The outlets of the first gas channel 66A and the second gas channel 66B open toward the path of the wire electrode 12.

An inlet of a discharge hole 72 of the block 52 opens on the through hole 52H between the third guide portion 58 and the first guide portion 54 and between the third guide portion 58 and the second guide portion 56. The discharge hole 72 may be constituted by two passages having independent outlets for each of the two inlets or may be constituted by one passage having a common outlet for the two inlets, or may be constituted by one passage having a common inlet and outlet. In the present embodiment, the discharge hole 72 is constituted by one passage having a common inlet and outlet.

The discharge hole 72 extends in the gravity direction. The inlet of the discharge hole 72 is connected to the through hole 52H from between the third guide portion 58 and the first guide portion 54 to between the third guide portion 58 and the second guide portion 56. The outlet of the discharge hole 72 is connected to the outside of the block 52.

Figure 4:
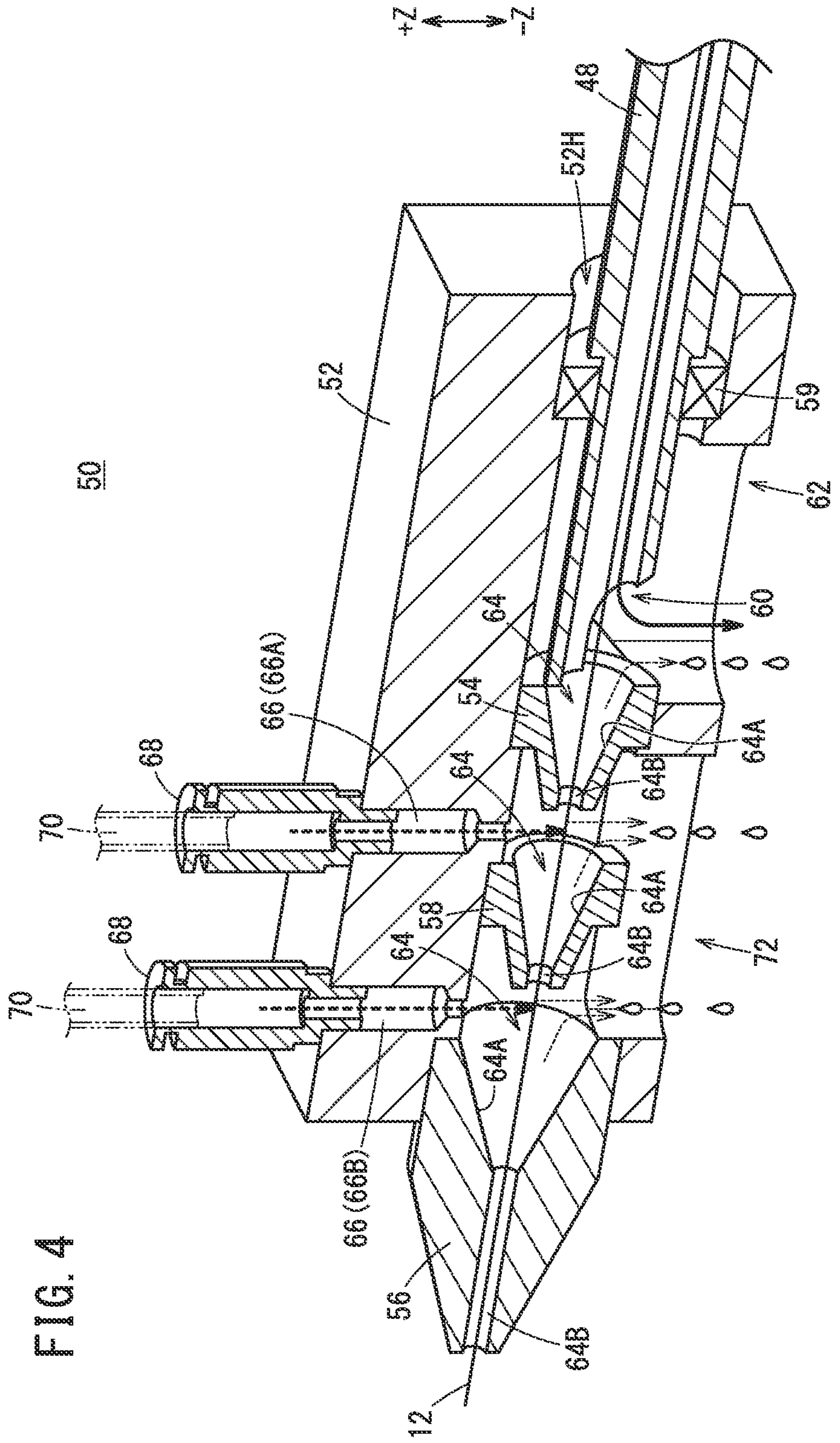
FIG. 4 is a view showing the flow of dielectric working fluid in the draining mechanism.

FIG. 4 is a view showing a state of flow of the dielectric working fluid in the draining mechanism 50. The wire electrode 12 fed from the discharge side end portion of the tube 48 is guided sequentially to the first guide portion 54, the third guide portion 58, and the second guide portion 56. The wire electrode 12 guided by the second guide portion 56 is fed out of the draining mechanism 50.

On the other hand, the compressed gas supplied from the compressor to the draining mechanism 50 via the gas tube 70 is blown, via the first gas channel 66A, onto the wire electrode 12 fed from the first guide portion 54 to the third guide portion 58. The compressed gas supplied from the compressor to the draining mechanism 50 via the gas tube 70 is blown, via the second gas channel 66B, onto the wire electrode 12 fed from the third guide portion 58 to the second guide portion 56. Specific examples of the gas used for the compressed gas include air and suchlike.

On the other hand, most of the dielectric working fluid flowing in the tube 48 falls, via the drain channel 62, from the cut 60 provided at the discharge-side end portion of the tube 48. A small portion of the dielectric working fluid flowing in the tube 48 is scattered to the guide hole 64 of the first guide portion 54. Alternatively, a small portion of the dielectric working fluid flowing in the tube 48 flows out from the first guide portion 54 to the output end portion side of the through hole 52H. Alternatively, a small portion of the dielectric working fluid flowing in the tube 48 sticks to the wire electrode 12.

The dielectric working fluid scattered in the guide hole 64 of the first guide portion 54 moves on an inner wall surface of the first guide portion 54, which inclines so as to become lower from the output end portion side to the input end portion side of the through hole 52H, and falls down via the drain channel 62.

The dielectric working fluid flowing out from the first guide portion 54 to the output end portion side of the through hole 52H falls under its own weight through the discharge hole 72.

The dielectric working fluid adhering to the wire electrode 12 is scattered by the compressed gas blown thereon through the gas channel 66. The scattered dielectric working fluid sticks to an inner wall surface of the block 52, an inner wall surface of the third guide portion 58, or an inner wall surface of the second guide portion 56. The inner wall surface of the third guide portion 58 or the inner wall surface of the second guide portion 56 inclines so as to become lower from the output end portion side to the input end portion side of the through hole 52H. The dielectric working fluid sticking to the inner wall surface moves on the inner wall surface under its own weight and falls via the discharge hole 72.

As described above, the block 52 of the draining mechanism 50 according to the present embodiment includes the gas channels 66 for guiding the compressed gas to part of the through hole 52H between the first guide portion 54 and the second guide portion 56. Further, the block 52 includes the discharge hole 72 connected to the through hole 52H at a position between the first guide portion 54 and the second guide portion 56, extending in the gravity direction and being connected to the outside of the block 52.

Thus, the draining mechanism 50 according to the present embodiment can drain, via the discharge hole 72, the dielectric working fluid flowing from the first guide portion 54 to a space between the first guide portion 54 and the second guide portion 56, using the weight of the dielectric working fluid itself. Further, using by the compressed gas guided to the through hole 52H, the draining mechanism 50 can blow away the dielectric working fluid sticking to the wire electrode 12 that passes through the through hole 52H. As a result, according to the draining mechanism 50, the dielectric working fluid can be removed from the wire electrode 12 without a suction device.

In the present embodiment, the outlets of the gas channels 66 are arranged, in the direction opposite to the gravity direction, from the path of the wire electrode 12 guided from the input end portion side to the output end portion side of the through hole 52H. As a result, the compressed gas can be blown onto the wire electrode 12, whereby the dielectric working fluid sticking to the wire electrode 12 can be guided to the discharge hole 72. Therefore, the dielectric working fluid can be removed more efficiently than in a case where the outlets of the gas channel 66 would not be arranged from the path of the wire electrode 12 in the direction opposite to the gravity direction.

Further, in the present embodiment, the cut 60 is provided at the gravity-direction wall portion of the discharge-side end portion of the tube 48. The block 52 of the draining mechanism 50 is formed with the drain channel 62 that guides the dielectric working fluid flowing out of the cut 60 to the outside of the block 52 in the gravity direction. Thus, even when the tube 48 is brought into contact with the first guide portion 54, the draining mechanism 50 can discharge, via the drain channel 62, most of the dielectric working fluid flowing in the tube 48. As a result, the draining mechanism 50 can shorten the length of the block 52 in the direction in which the through hole 52H penetrates. Further, the draining mechanism 50 can discharge, to the outside of the block 52, most of the dielectric working fluid flowing out of the discharge-side end portion of the tube 48 without guiding it into the first guide portion 54.

In addition, in the present embodiment, the third guide portion 58 is provided in the through hole 52H between the first guide portion 54 and the second guide portion 56, apart from the first guide portion 54 and from the second guide portion 56. In addition, the gas channels 66 of the draining mechanism 50 are connected to the through hole 52H at positions between the first guide portion 54 and the third guide portion 58 and between the second guide portion 56 and the third guide portion 58. As a result, the certainty of removing the dielectric working fluid from the wire electrode 12 can be enhanced as compared with a case where the third guide portion 58 would not be provided.

Further, in this embodiment, the guide hole 64 has the tapered portion 64A. The tapered portion 64A is formed in such a way that the hole becomes smaller from the input end portion side to the output end portion side of the through hole 52H. Thus, the inner wall surfaces of the guide portions (the first guide portion 54, the second guide portion 56 and the third guide portion 58) inclines so as to become lower from the output end portion side to the input end portion side of the through hole 52H. Therefore, the dielectric working fluid scattered on the tapered portion 64A can be discharged via the drain channel 62 or the discharge hole 72.

MODIFIED EXAMPLE

The above-described embodiment may be modified as follows.

Modified Example 1

Figure 5:
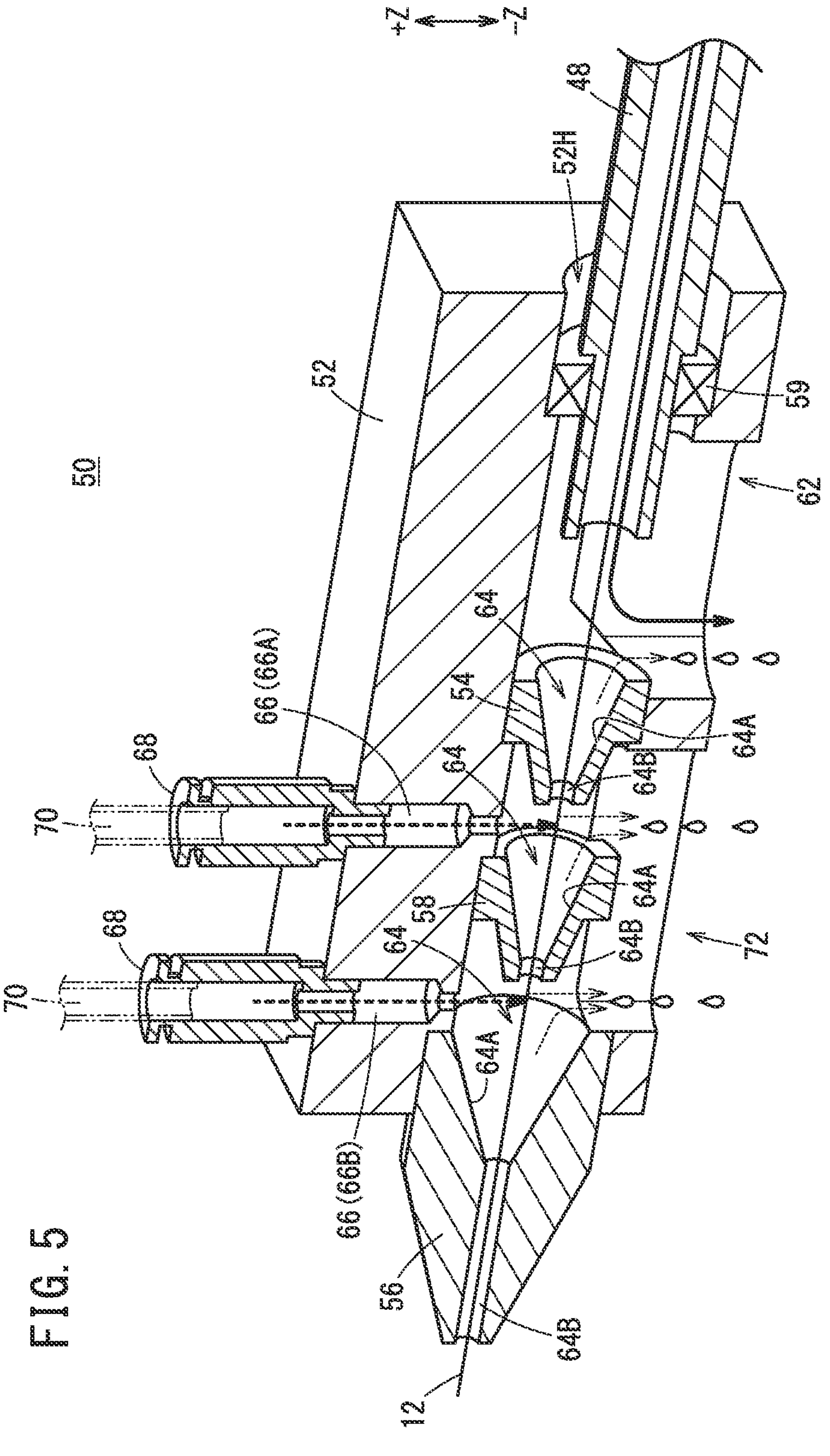
FIG. 5 is a cross-sectional view showing a configuration of a draining mechanism according to a first modification.

FIG. 5 is a cross-sectional view showing a configuration of a draining mechanism 50 according to the first modified example. In FIG. 5, components equivalent to those described above are denoted by the same reference numerals. In this modified example, descriptions that overlap with those described above are omitted.

In this modified example, there is no cut 60 (FIG. 2) at the discharge-side end portion of the tube 48, and the first guide portion 54 is provided at a distance from the discharge-side end portion of the tube 48. Thus, as in the above-described embodiment, most of the dielectric working fluid flowing in the tube 48 can be discharged via the water drain channel 62.

Modified Example 2

The outlet of at least one of the first gas channel 66A and the second gas channel 66B is not limited to the case where it is arranged from the path of the wire electrode 12 in the direction opposite to the gravity direction. For example, the outlet of at least one of the first gas channel 66A and the second gas channel 66B may be arranged on an inner wall surface of the block 52 that is positioned from the path of the wire electrode 12 in the gravity direction. Alternatively, the outlet of at least one of the first gas channel 66A and the second gas channel 66B may be arranged on an inner wall surface of the block 52 that intersects a plane passing through the path of the wire electrode 12 in the X direction.

Modified Example 3

The first gas channel 66A may have two or more outlets connected to the through hole 52H at positions between the first guide portion 54 and the third guide portion 58. Further, the second gas channel 66B may have two or more outlets connected to the through hole 52H at positions between the second guide portion 56 and the third guide portion 58. In these cases, in comparison with the case where the first gas channel 66A or the second gas channel 66B has only one outlet, more dielectric working fluid can be blown off the wire electrode 12.

Modified Example 4

The third guide portion 58 may be omitted. Further, two or more third guide portions 58 may be provided in the through hole 52H between the first guide portion 54 and the second guide portion 56. When two or more third guide portions 58 are provided, an interval is provided between adjacent third guide portions 58. The gas channel 66 has an outlet connected to the through hole 52H between adjacent third guide portions 58. When two or more third guide portions 58 are provided, more dielectric working fluid can be removed from the wire electrode 12 than a case where only one third guide portion 58 is provided.

Hereinafter, the invention that can be understood from the above-described embodiments and modified examples will be described.

The present invention is the draining mechanism (50) for removing liquid from a wire electrode, the liquid flowing in a tube (48) into which the wire electrode (12) is inserted and that guides feeding of the wire electrode, the draining mechanism (50) comprising: a block (52) that is formed with a through hole (52H) penetrating in a direction intersecting a gravity direction, wherein a discharge-side end portion of the tube is disposed at one end portion of the through hole; a first guide portion (54) that is provided between the discharge-side end portion of the tube and another end portion of the through hole and is formed with a guide hole (64) guiding the wire electrode from one end side of the through hole to another end side of the through hole; and, a second guide portion (56) that is provided at another end portion of the through hole so as to be apart from the first guide portion and is formed with the guide hole, and wherein the block includes: a gas channel (66) that is connected to the through hole between the first guide portion and the second guide portion and guides, to the through hole, compressed gas supplied from an outside; and, a discharge hole (72) that is connected to the through hole at a position between the first guide portion and the second guide portion, and extends in the gravity direction and is connected to the outside of the block.

Thus, the dielectric working fluid flowing from the first guide portion to the output end portion side of the through hole can be discharged through the discharge hole under its own weight, and the dielectric working fluid sticking to the wire electrode can be blown off by the compressed gas guided to the through hole. As a result, the dielectric working fluid can be removed from the wire electrode without a suction device.

The outlet of the gas channel may be arranged in a direction opposite to the gravity direction from a path of the wire electrode guided from the one end portion side of the through hole to the another end portion side of the through hole. As a result, the compressed gas can be blown onto the wire electrode and the dielectric working fluid sticking to the wire electrode can be guided to the discharge hole. Therefore, the dielectric working fluid can be removed more efficiently than in a case where the outlet of the gas channel would not be arranged from the path of the wire electrode in the direction opposite to the gravity direction.

A wall portion of the discharge-side end portion of the tube in the gravity direction may be provided with a cut (60) that drains the liquid, and the block may include a drain channel (62) that guides, to the outside of the block in the gravity direction, the liquid flowing out from the cut. Thus, even if the tube is brought into contact with the first guide portion, most of the dielectric working fluid flowing in the tube can be discharged through the drain channel. As a result, the length of the block in the direction in which the through hole penetrates can be reduced. Further, most of the dielectric working fluid flowing out from the discharge-side end portion of the tube can be discharged to the outside of the block without flowing into the first guide portion.

The first guide portion may be provided so as to be apart from the discharge side end portion of the tube, and the block may include a drain channel that guides the liquid flowing out from the discharge-side end portion of the tube to the outside of the block in the gravity direction. Thus, most of the dielectric working fluid flowing in the tube can be discharged through the drain channel.

The draining mechanism may further include a third guide portion (58) that is provided in the through hole between the first guide portion and the second guide portion so as to be apart from the first guide portion and the second guide portion and is formed with the guide hole, wherein the gas channel may be one of a plurality of gas channels, and the plurality of gas channels are connected to the through hole at a position between the first guide portion and the third guide portion and a position between the second guide portion and the third guide portion. As a result, the amount of dielectric working fluid to be removed from the wire electrode can be increased in comparison with the case where the third guide portion is not provided.

The guide hole may include a tapered portion (64A) formed so as to become smaller toward the one end portion of the through hole. Thus, the inner wall surface of the guide portion inclines so as to become lower from the output end portion side to the input end portion side of the through hole. Therefore, the dielectric working fluid scattered on the tapered portion can be discharged through the drain channel or the discharge hole.

The invention claimed is:

1. A draining mechanism for removing liquid from a wire electrode, the liquid flowing in a tube into which the wire electrode is inserted and that guides feeding of the wire electrode, the draining mechanism comprising:
- a block that is formed with a through hole penetrating in a direction intersecting a gravity direction, wherein a discharge-side end portion of the tube is disposed at one end portion of the through hole;
- a first guide portion that is provided between the discharge-side end portion of the tube and another end portion of the through hole and is formed with a guide hole guiding the wire electrode from one end portion side of the through hole to another end portion side of the through hole; and
- a second guide portion that is provided at the another end portion of the through hole so as to be apart from the first guide portion, and is formed with the guide hole, wherein the block includes:
- a gas channel that is connected to the through hole at a position between the first guide portion and the second guide portion and guides, to the through hole, compressed gas supplied from an outside; and
- a discharge hole that is connected to the through hole at a position between the first guide portion and the second guide portion, and extends in the gravity direction and is connected to an outside of the block, a wall portion of the discharge-side end portion of the tube in the gravity direction is provided with a cut that drains the liquid, the cut is positioned between the one end portion of the through hole and the guide hole of the first guide portion, the block includes a drain channel that guides, to the outside of the block in the gravity direction, the liquid flowing out from the cut, and a space configured to guide the compressed gas in the gravity direction is formed from the gas channel to the discharge hole in the through hole positioned between the first guide portion and the second guide portion.

2. The draining mechanism according to claim 1, wherein an outlet of the gas channel is arranged in a direction opposite to the gravity direction from a path of the wire electrode guided from the one end portion side of the through hole to the another end portion side of the through hole.

3. The draining mechanism according to claim 1, wherein the first guide portion is provided so as to be apart from the discharge side end portion of the tube, and the block includes a drain channel that guides, to the outside of the block in the gravity direction, the liquid flowing out from the discharge-side end portion of the tube.

4. The draining mechanism according to claim 1, further comprising a third guide portion that is provided in the through hole between the first guide portion and the second guide portion so as to be apart from the first guide portion and the second guide portion and is formed with the guide hole, wherein the gas channel is one of a plurality of gas channels, the plurality of gas channels are connected to the through hole at a position between the first guide portion and the third guide portion and a position between the second guide portion and the third guide portion.

5. The draining mechanism according to claim 1, wherein the guide hole includes a tapered portion that is formed so as to become smaller toward the another one end portion of the through hole.

* * * * *